L. G. Merrill,
Chopping Wooden Substances under Water,
N°. 34,211.      Patented Jan. 21, 1862.
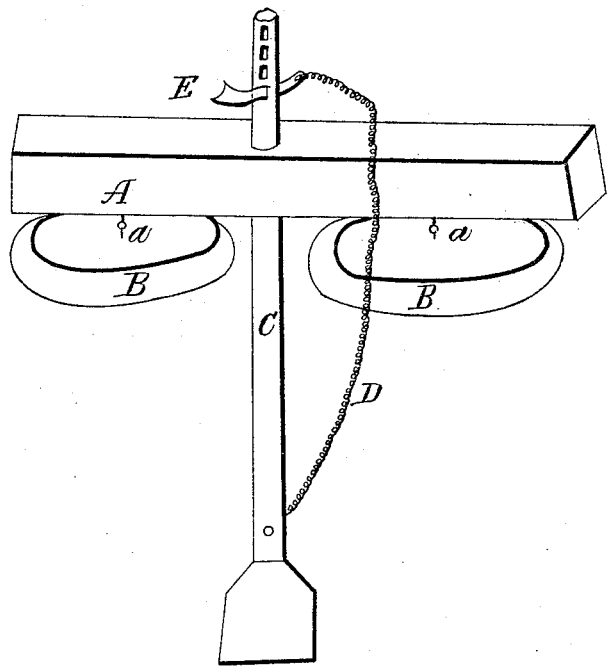
Witnesses:
Inventor:
Lowell. G. Merrill

UNITED STATES PATENT OFFICE.

LOWELL G. MERRILL, OF ANGEL'S, CALIFORNIA.

MODE OF CHOPPING TO PIECES SHIPS OR OTHER WOODEN SUBSTANCES UNDER WATER.

Specification forming part of Letters Patent No. 34,211, dated January 21, 1862.

*To all whom it may concern:*

Be it known that I, LOWELL G. MERRILL, of Angel's, in the county of Calaveras, in the State of California, have invented a new Improvement in Machines for Chopping to Pieces Ships, Vessels, or other Wooden Substances Situated or Sunk under Water; and I do hereby declare that the following is a full and exact description thereof, reference being had to the accompanying drawings.

In the drawing, B B represent two buoys or boats, to which the timber A placed upon them is secured by central links or hinges, as shown at $a$. A circular hole is made through timber A for the hollow tool-shaft $c$ to work in.

E is a key for holding the tool, which is made of iron and capable of being adjusted to different heights, according to the depth of water in which it is to be used. The chain D, fastened to the shaft and to the key, is used to elevate and let down the tool, as occasion may require.

The manner of using my improved device is as follows: The buoys and timber are anchored or otherwise secured upon the water over the sunken vessel or other sunken substance to be chopped or cut to pieces, and the action of the waves will cause the buoys, and consequently the chisel or tool of any suitable description which may be used, to rise and fall or partake of a rocking motion, thus cutting the sunken vessel or substance which is intended to be removed.

Having fully described my improvement, what I claim, and desire to secure by Letters Patent, is—

The construction and arrangement of the several parts A, B, C, D, E, and $a$ in the manner described to be operated by the action of the water, as described, for the purpose stated.

LOWELL G. MERRILL.

Attest:
  R. SPARKS,
  WM. TAIT,
  H. B. WILSON.